(12) United States Patent
Nonnenmacher et al.

(10) Patent No.: US 6,431,013 B2
(45) Date of Patent: *Aug. 13, 2002

(54) STRAIN GAGE HAVING AN ATTACHED UNSTRAINED AREA FOR THE MOUNTING OF SIGNAL CONDITIONING COMPONENTS

(75) Inventors: Ronald C. Nonnenmacher, Elkhart; Patrick B. Blakesley, Goshen; James M. Newcomer, Elkhart, all of IN (US)

(73) Assignee: CTS Corporation, Elkhart, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/813,336

(22) Filed: Mar. 20, 2001

Related U.S. Application Data

(63) Continuation-in-part of application No. 09/374,874, filed on Aug. 16, 1999.

(30) Foreign Application Priority Data

Mar. 21, 2000 (JP) ........................................ 2000-078683

(51) Int. Cl.[7] ................................................. G01L 1/04
(52) U.S. Cl. ................................................. 73/862.632
(58) Field of Search ........................ 73/788, 794, 818, 73/820, 855, 856, 862.044, 862.046, 862.629, 862.632, 862.637

(56) References Cited

U.S. PATENT DOCUMENTS

| | | | |
|---|---|---|---|
| 4,556,598 A | | 12/1985 | Bloom |
| 5,232,243 A | | 8/1993 | Blackburn |
| 5,456,119 A | * | 10/1995 | Nakazaki et al. ........... 177/136 |
| 5,573,269 A | | 11/1996 | Gentry |
| 5,739,757 A | | 4/1998 | Gioutsos |
| 5,754,167 A | * | 5/1998 | Narusawa et al. .......... 345/161 |
| 5,821,633 A | | 10/1998 | Burke |
| 5,942,695 A | | 8/1999 | Verma |
| 5,959,214 A | | 9/1999 | Vaidyanthan |
| 5,971,432 A | | 10/1999 | Gagnon |
| 5,986,221 A | | 11/1999 | Stanley |
| 6,039,344 A | | 3/2000 | Mehney |
| 6,055,869 A | * | 5/2000 | Stemme et al. ............. 604/533 |
| 6,069,325 A | | 5/2000 | Aoki |
| 6,070,115 A | * | 5/2000 | Oestreicher et al. ........ 280/735 |
| 6,092,838 A | | 7/2000 | Walker |
| 6,109,117 A | | 8/2000 | Stanley |
| 6,161,891 A | | 12/2000 | Blakesley |

FOREIGN PATENT DOCUMENTS

| | | |
|---|---|---|
| GB | 2333070 A | 7/1999 |
| JP | 1990000008325 | 9/1990 |

OTHER PUBLICATIONS

Web Page Logitech ifeel mouse URL:http://www.logitech.com/cf/products/productfeatures.cfm/79.

* cited by examiner

*Primary Examiner*—Max Noori
(74) *Attorney, Agent, or Firm*—Mark P. Bourgeois; Mark W. Borgman

(57) ABSTRACT

A weight sensor for measuring a weight applied to the sensor. The sensor includes a substrate that has a center section that is adapted to flex in response to the applied weight and a step section that is attached to the center section. The step section concentrates the weight onto to the center section. Strain gage resistors are mounted on the center section of the substrate for generating an electrical signal in response to the substrate being flexed. A wing section is attached to the center section. The wing section is out of the weight path and does not flex. The wing section contains signal conditioning electronics operative to condition the electrical signal.

15 Claims, 2 Drawing Sheets

STRAIN GAGE HAVING AN ATTACHED UNSTRAINED AREA FOR THE MOUNTING OF SIGNAL CONDITIONING COMPONENTS

CROSS REFERENCE TO RELATED AND CO-PENDING APPLICATIONS

This application is a continuation in part of U.S. patent application Ser. No. 09/374,874, filed Aug. 16, 1999 and titled, "Automobile seat weight Sensor".

This application is related to the following U.S. patent applications:

U.S. patent application Ser. No. 09/374,870, filed Aug. 16, 1999 and titled, "Vehicle Occupant Position Detector and Airbag Control System".

U.S. Pat. No. 6,161,891 issued Dec. 19, 2000 and titled, "Vehicle Seat Weight Sensor".

BACKGROUND OF THE INVENTION

The foregoing patents have the same assignee as the instant application and are herein incorporated by reference in their entirety for related and supportive teachings.

1. Field of the Invention

This invention relates to an automobile weight sensor for detecting the presence of a person having a weight in a car seat, and in particular to a sensor that can detect the presence of an occupant using strain sensitive resistors and provide an electrical signal to control activation of an airbag.

2. Description of the Related Art

Various devices are well known for their ability to measure force, pressure, acceleration, temperature, position, etc. by using a sensing structure combined with signal processing electronics. One general type of sensor or transducer for such applications is a resistive strain gauge sensor in which force or pressure is sensed or measured based on strain placed on the resistors. Resistive strain gauges function by exhibiting changes in resistance proportional to force which causes dimensional changes of the resistor. An electrical signal changes voltage level as the resistance changes.

Many types of strain gauge sensors have been designed and made commercially available. Various strain gauge sensors have proven to be generally satisfactory. Prior art sensors, however, have tended to be rather expensive and not suitable in certain applications such as sensing the presence of an occupant in an automobile seat. A sensor suitable for such an application must be compact, robust, impervious to shock and vibration and yet inexpensive.

Automobile seats can use sensors to activate air bags, which would be deployed during an accident. Injury to infants or small children from air bag deployment with excessive force is a current industry problem. A weight sensor in the seat can be used to control the deployment force during air bag activation. If a heavy person is in the seat, the airbag is deployed at full force. If a light person is in the seat, such as a child, the airbag is deployed at a slower, less forceful rate or not at all.

The generated electrical signal does not vary greatly with the weight. As a result the typical electrical signal to be sensed is in the order of millilvolts. When this electrical signal is connected by a wiring harness to an airbag controller, it is sussepetible to noise from cross-talk and coupled electromagnetic interference. This noise can result in an inaccurate weight reading.

A current unmet need exists for a reliable, low cost, simple and robust automobile seat weight sensor that is not affected by noise from cross-talk and coupled electromagnetic interference.

3. Related Art

Examples of patents that are related to the present invention are as follows, and each patent is herein incorporated by reference for the supporting teachings:

U.S. Pat. No. 5,573,269 is an apparatus for sensing and restraining an occupant of a vehicle seat.

U.S. Pat. No. 4,556,598 is a porcelain tape for producing porcelainized metal substrates.

SUMMARY OF THE INVENTION

It is a feature of the invention to provide a reliable and cost-effective weight sensor and strain gage for detecting weight.

An additional feature of the invention is to provide a weight sensor for measuring a weight applied to the sensor. The sensor includes a substrate having a center section that is adapted to flex in response to the applied weight, at least one step section that is attached to the center section, the center section located adjacent the step section, the step section adapted to concentrate the weight applied thereon onto to the center section and at least one outer section that is attached to the step section. At least one strain gage resistor is mounted on the center section of the substrate for generating an electrical signal in response to the substrate being stressed. At least one wing section is attached to the center section. The wing section is adapted to be out of the path of the weight and not to flex. The wing section contains signal conditioning electronics operative to condition the electrical signal.

The invention resides not in any one of these features per se, but rather in the particular combination of all of them herein disclosed and claimed and it is distinguished from the prior art in this particular combination of all of its structures for the functions specified. Other features of the present invention will become more clear from the following detailed description of the invention, taken in conjunction with the accompanying drawings and claims, or may be learned by the practice of the invention.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Figure 1:
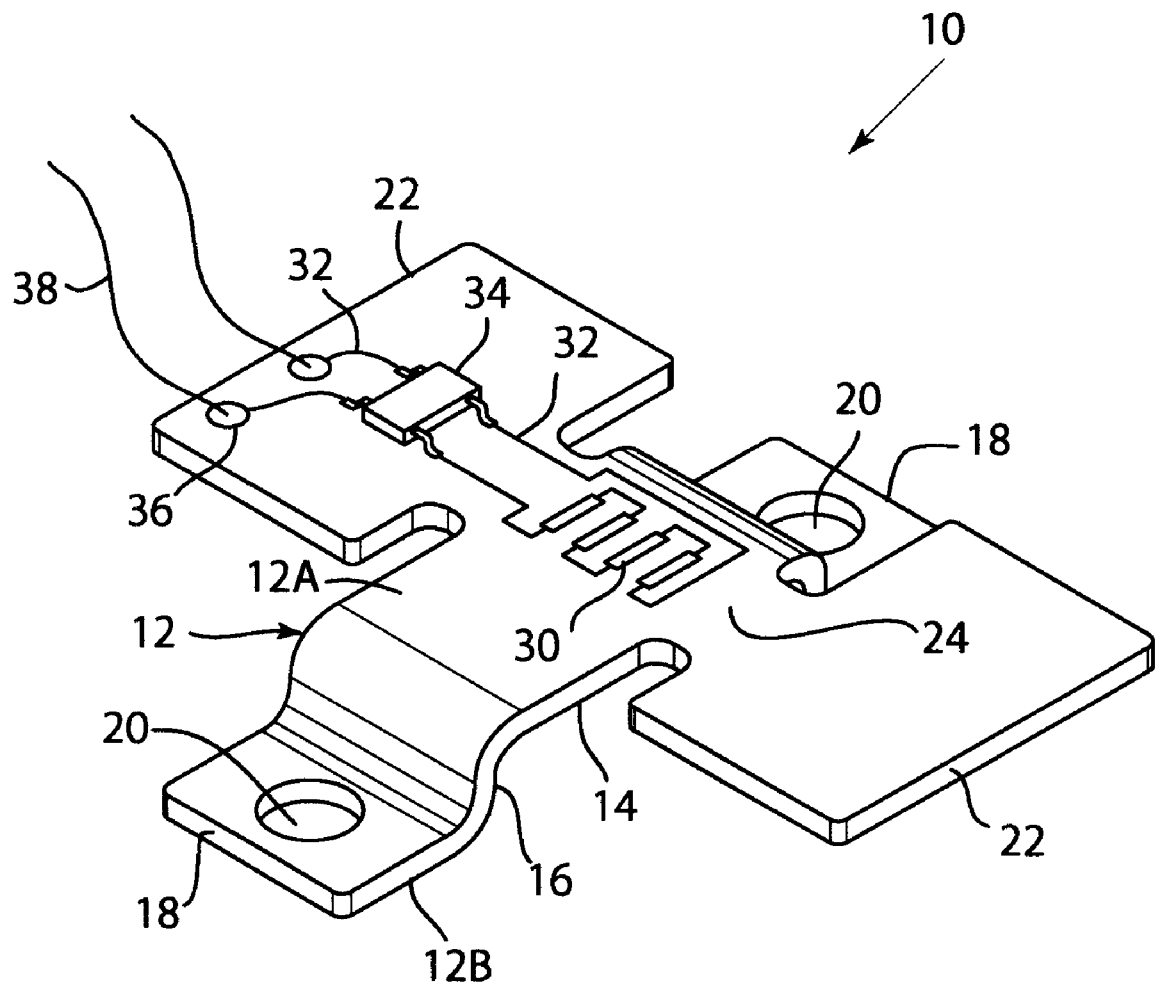
FIG. 1 is a perspective view of the preferred embodiment of a strain gage having an integral amplifier.

It is noted that the drawings of the invention are not to scale. The drawings are intended to depict only typical embodiments of the invention, and therefore should not be considered as limiting the scope of the invention. The invention will be described with additional specificity and detail through the use of the accompanying drawings. In the drawings like numbering represents like elements between the drawings.

DETAILED DESCRIPTION OF THE PREFERRED EMBODIMENTS

Referring to FIG. 1, a strain gage or sensor with integral amplifier 10 is shown. Sensor 10 has a metal substrate 12 with an upper surface 12A and a bottom surface 12B. Metal substrate 12 is preferably formed from steel. Substrate 12 has step sections 16 that extends downwardly generally perpendicularly on both sides of a center section 14. A pair of outer flat sections 18 connect with and extend away from step sections 16. Apertures 20 are located in outer sections 18. Fasteners (not shown) would be used to attach strain gage 10 to a structure that supports a weight or force to be measured. The step sections concentrate the force of the weight to be measured onto the center section causing the center section to slightly flex.

A pair of wing sections 22 are attached by bridges 24 to center section 14. The wing sections 22 are also formed from steel and are preferably stamped at the same time as the rest of substrate 12. The wing sections 22 are located out of the strain or flexing path that affects center section 14. The weight applied to strain gage 10 does not cause the wing sections to flex or have strain therein. Several strain gauge resistors 30 are arranged on surface 12A in center section 14. Details of the manufacture and operation of resistors 30 are contained in the parent application U.S. patent application Ser. No. 09/374,874, filed Aug. 16, 1999 and titled, "Automobile seat weight Sensor", which is herein incorporated by reference. Resistors 30 are strain sensitive and will change resistance based on the amount of strain in center section 14. A voltage source (not shown) applies a voltage source to resistors 30. The voltage level across the resistors changes in proportion to the applied strain and produces an electrical output signal. Resistors 30 are connected to an electronic signal processing component 34 by a circuit line 32. Signal processing component can include amplifiers to amplify the signal and filters to filter the signal and an analog to digital converter to convert the signal to a digital signal. In a typical configuration, Resistors 30 are connected to form a full bridge circuit (not shown) that is well known in the art.

Another circuit line 32 connects to electronic component 34 and to an output pad 36. The output pads 36 are used to solder to individual wires in a wiring harness 38. Wiring harness 38 would typically connect with an airbag controller through a connector (not shown).

Resistors 30 can also be formed from a ceramic green tape. Such methods of forming resistors on metal substrates are detailed in U.S. Pat. No. 4,556,598 titled, "A porcelain tape for producing porcelainized metal substrates", the contents of which are specifically herein incorporated by reference.

Prior art strain gages produce an output voltage in the millivolt range. With the present invention, strain gage with integral amplifier 10 of the present invention can produce an output signal of several volts. This makes the strain gage more compatible with low cost computer systems such as those used in automotive applications. The dimensions of the substrate can be varied to sense various weight ranges. For example, one design could have a full scale load of 10 pounds while another design might have a full scale load of 400 pounds.

Electronic component 34 amplifies the electrical signal. Electronic component 34 can be a OPA-2241 available from Texas Instruments of Dallas, Texas. Various amplifier type circuits can be used. The electronic components are located on the wing 22 which is formed on the same substrate 12 as the strain gage, but is in an area of very low to zero stress. The reduced stress promotes long component life for the electronic components by not subjecting the solder joints to excess mechanical stress. Having the electronics directly adjacent the strain gage resistors 30 provides a physically short signal path from the strain gage to the signal processing electronics. This reduces the overall size of the sensor and makes the sensor less susceptible to interference from noise.

The use of bridge 24 to mount wing 22 significantly reduces stress on the electronics components from the applied load and carries conductor traces to connect the electronics to the resistors.

Figure 2:
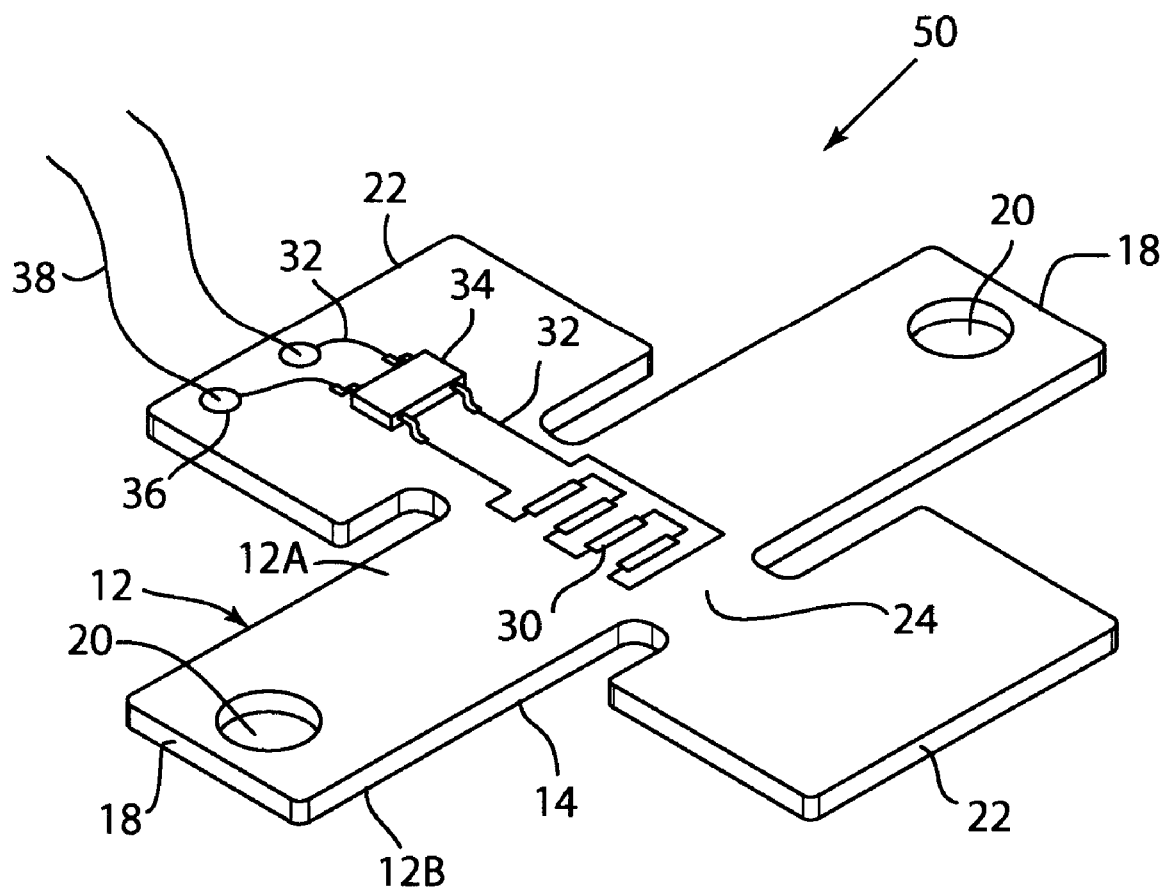
FIG. 2 is a perspective view of an alternative embodiment of a strain gage having an integral amplifier.

Referring to FIG. 2, an alternative embodiment of a strain gage or sensor with integral amplifier 50 is shown. Sensor 50 is similar to sensor 10 of FIG. 1 except that the step sections have been eliminated. In sensor 50 the center section 14 is connected directly to the outer flat sections 18.

While the invention has been taught with specific reference to these embodiments, someone skilled in the art will recognize that changes can be made in form and detail without departing from the spirit and the scope of the invention. The invention should therefore be limited only by the scope of the human imagination. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A weight sensor for measuring a weight applied to the sensor, comprising:
   a) a substrate including:
      1) a center section that is adapted to flex in response to the applied weight;
      2) at least one step section attached to the center section, the center section located adjacent the step section, the step section adapted to concentrate the weight applied thereon onto to the center section; and
      3) at least one outer section attached to the step section;
   b) at least one strain gage resistor, mounted on the center section of the substrate, for generating an electrical signal in response to the substrate being stressed; and
   c) at least one wing section attached to the center section, the wing section adapted to be out of the path of the weight and not to flex, the wing section containing signal conditioning electronics operative to condition the electrical signal.

2. The weight sensor according to claim 1, wherein at least one circuit line electrically connects the strain gage resistor to the signal conditioning electronics.

3. The weight sensor according to claim 1, wherein the wing section is connected to the center section by a bridge.

4. The weight sensor according to claim 1, wherein a wiring harness is electrically connected to the signal conditioning electronics.

5. The weight sensor according to claim 1, wherein the signal conditioning electronics converts the electrical signal to a digital electrical signal.

6. The weight sensor according to claim 5, wherein the signal conditioning electronics includes at least one amplifier and an analog to digital converter.

7. The weight sensor according to claim 5, wherein the outer section has an aperture passing therethrough.

8. A weight sensor for measuring a weight applied to the sensor, comprising:
   a) a gull wing shaped substrate having a center section that is adapted to flex in response to the applied weight and a pair of outer sections attached to the center section;
   b) at least one strain gage resistor, mounted on the center section of the substrate, for generating an electrical signal in response to the substrate being stressed; and
   c) at least one wing section attached to the center section, the wing section adapted to be out of the path of the weight and not to flex, the wing section containing signal conditioning electronics operative to condition the electrical signal.

9. The weight sensor according to claim 8, wherein a step section is attached between the center section and the outer sections, the step sections adapted to concentrate the weight applied thereon onto to the center section.

10. The weight sensor according to claim 9, wherein at least one circuit line electrically connects the strain gage resistor to the signal conditioning electronics.

11. The weight sensor according to claim 8, wherein the wing section is connected to the center section by a bridge.

12. The weight sensor according to claim 8, wherein a wiring harness is electrically connected to the signal conditioning electronics.

13. The weight sensor according to claim 8, wherein the signal conditioning electronics converts the electrical signal to a digital electrical signal.

14. The weight sensor according to claim 8, wherein the signal conditioning electronics includes at least one amplifier and an analog to digital converter.

15. The weight sensor according to claim 8, wherein the outer section has an aperture passing therethrough.

* * * * *